(No Model.)
A. E. HERMAN.
VEHICLE AXLE.
No. 409,680. Patented Aug. 27, 1889.
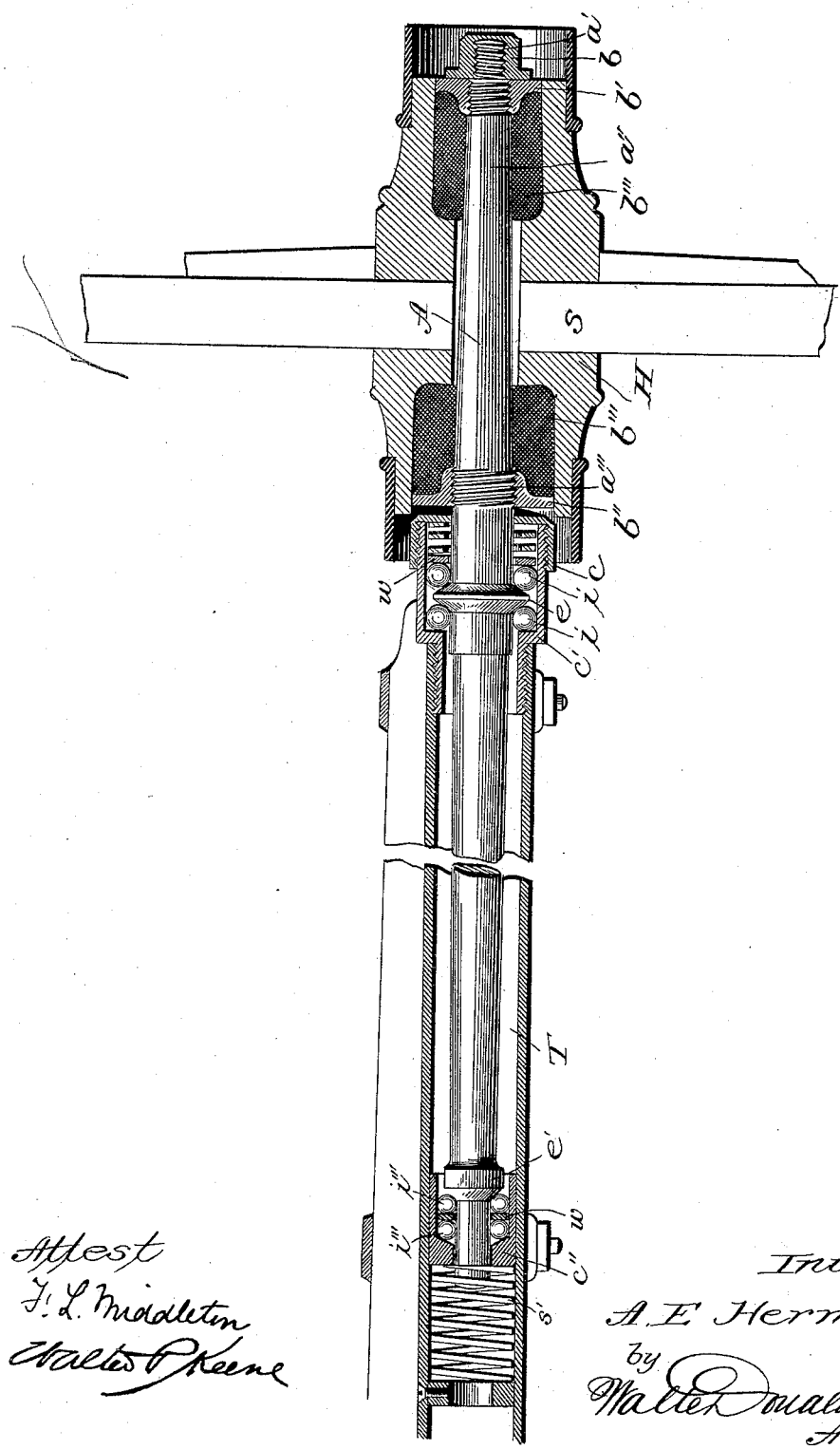
Attest
T. L. Middleton
Walter P. Keene
Inventor
A. E. Herman
by
Walter Donaldson & Co.
Attys

UNITED STATES PATENT OFFICE.

ADOLPH E. HERMAN, OF TERRE HAUTE, INDIANA.

VEHICLE-AXLE.

SPECIFICATION forming part of Letters Patent No. 409,680, dated August 27, 1889.

Application filed February 15, 1889. Serial No. 300,066. (No model.)

*To all whom it may concern:*

Be it known that I, ADOLPH E. HERMAN, a citizen of the United States, residing at Terre Haute, in the county of Vigo and State of Indiana, have invented certain new and useful Improvements in Vehicle-Axles; and I do hereby declare that the following is a full, clear, and exact description of the invention, which will enable others skilled in the art to which it appertains to make and use the same, reference being had to the accompanying drawing, and to the letters of reference marked thereon, which forms part of this specification.

My invention relates to improvements in vehicle-axles in which a spindle fastened firmly into the hub of a wheel revolves with said wheel and finds its bearings upon the inside of a hollow axle, the bearings being ball-bearings and four in number, also in which the lateral jar or shock is relieved. I attain these objects by the mechanism illustrated in the accompanying drawing, which represents a section through the hub and its support with parts in side elevation.

The letter A indicates a metalic spindle of which the following is a full description: A metallic spindle consisting of a shank $a$, which is tapered slightly toward its outer end and upon which the wheel-hub is fixed in a manner hereinafter described. The extreme end of $a$ is turned to a smaller diameter for a space of about one-half inch, said space ending against a shoulder formed by the increased size of shank $a$. Upon this smaller end is cut a thread $a'$ for carrying a set-nut $b$, said nut being a left-hand nut. Beginning at the aforesaid shoulder and running back upon the shank $a$ is cut a right-hand thread $a''$. At the innermost end of the shank $a$ is cut another thread $a'''$, right-hand and slightly beveled. Directly back of thread $a'''$ there is an enlargement $a^{iv}$ of the spindle, said enlargement being smoothly turned, about two inches in length. From the middle of $a^{iv}$ rises a flange $e$, which acts as a bearing for two sets of steel balls, ($i$ and $i'$), one set upon either side. From the end of $a^{iv}$ the spindle tapers down for a distance of about eight and one-half inches. At that distance another flange $e'$ or enlargement is turned upon the spindle, said flange $e'$ being beveled upon its back side, forming a bearing. The spindle extends an inch or two past $e'$, and being turned down smoothly to a small diameter serves as a bearing for two sets of balls $i''$ and $i'''$.

The letters $b'''$ and $b'''$ indicate a pair of rubber pieces which are rolled about the shank $a$, one at each end. These pieces of rubber, when wrapped around the shank $a$, form a bushing for the inside of the wheel-hub H, and thus fix the hub firmly upon the spindle. Furthermore, to absolutely fix the hub upon the spindle, there are two nuts $b'$ and $b''$ formed with beveled flanges. These flanges, when the nuts are screwed up tight, wedge themselves between the spindle and the rubber bushings $b''' b'''$, thus binding the hub upon the shank $a$. The nut $b'$ is held by the set-nut $b$.

The letter T indicates a metal axle-tube, into which the spindle A is inserted and works upon the four sets of ball-bearings $i$ $i'$ $i''$ $i'''$.

The letter $c'$ indicates a short tube. This tube is formed with two different diameters connected by a shoulder or flange. Upon the outside and at the ends of the tube two threads are cut, both right hand. The back thread, or the one upon the smaller end of $c'$, fits into the inside thread cut into the axle-tube T, while the front or larger thread fits the inside thread of the metallic cap $c$, which cap incloses within the tube $c'$ the flange $e$, upon each side of which act a set of balls $i$ and $i'$, a washer and a strong steel spring $s$ holding said balls in their places, and, too, receiving the lateral jar of the wheel.

The letter $f$ indicates a flange or shoulder upon the inside of the axle-tube T and against which the steel spring $s$ bears. This spring, besides helping to relieve the lateral jar of the vehicle-wheel, holds the metallic cup $c''$ in its proper position, said cup serving to inclose between its walls and the flange $e'$ two sets of balls $i''$ and $i'''$, these two sets being separated by a metal washer. The balls $i''$ and $i'''$ find bearings against the walls of the cup $c''$, the flange $e'$, and the spindle itself.

The letter H indicates a wheel-hub, and S a spoke of the same.

The chief advantages in my invention over other vehicle-axles are: The spindle moving with the wheel allows of the use of the rubber bushings $b''' \; b'''$, the two springs $s$ and $s'$, and the four sets of balls $i, \; i', \; i'',$ and $i'''$, all of which serve to relieve the unpleasant and injurious jar so unavoidable in other similar contrivances; the possibility of ball-bearings, giving the finest of running-bearings, necessitating little or no lubrication and requiring little repairing, the last-mentioned advantage arising from the fact that the nuts which secure the wheel to the axle are all beveled, thus making it adjustable.

I make no claim upon the invention of a wheel or an axle; but

I do claim—

1. In combination, the wheel, the longitudinally-movable spindle secured thereto to revolve therewith, the bearing for the spindle having the anti-friction balls therein, the said spindle having a circumferential flange to afford a bearing for the said balls, substantially as described.

2. In combination, the wheel, the spindle having rotary and longitudinal movement, said spindle having a flange or projection, and the spring for holding the spindle with a yielding pressure, substantially as described.

3. In combination, the wheel, the spindle secured thereto and revoluble therewith, a bearing for said spindle, and yielding means for keeping said spindle in position relative to its bearings and to permit longitudinal movement thereof under strain, substantially as described.

4. In combination, the wheel, the axle, the longitudinally-movable spindle, and the ball-bearings for said spindle, whereby both rotary and longitudinal movement of the spindle is permitted, substantially as described.

5. In combination, the wheel, the spindle secured thereto and revoluble therewith, anti-friction bearings for said spindle comprising the balls, and the yielding means for permitting the spindle to move longitudinally under strain, substantially as described.

6. In combination, the wheel, the spindle secured thereto and having a shoulder or flange, the ball-bearing, and the spring, substantially as described.

7. In combination, the wheel, the spindle secured thereto, the plain tubular bearing part T for receiving the spindle, the anti-friction balls, and the sleeve or bearings for said balls supported by the plain tube T, substantially as described.

8. In combination, the wheel, the spindle secured thereto, the tube T for receiving the spindle, the anti-friction bearing, and the part $c'$, screwed to the end of the tube T and holding the anti-friction balls, substantially as described.

9. In combination, the wheel, the spindle secured thereto, the bearing $c''$, containing the anti-friction balls, a suitable support for the bearing, said bearing being arranged to have sliding movement, and the spring, substantially as described.

10. In combination, the wheel, the longitudinally-movable spindle, the anti-friction balls and a movable washer for confining said balls, and the yielding holding means for the washer, substantially as described.

11. In combination, the spindle and the wheel secured thereto by an adjustable nut on each side threaded upon the spindle, substantially as described.

12. In combination, the longitudinally-movable spindle with yielding holding means, and the wheel secured to said spindle with yielding bushings, substantially as described.

In testimony that I claim the foregoing as my own I affix my signature in presence of two witnesses.

ADOLPH E. HERMAN.

Witnesses:
FRED L. PAIGE,
GEO. M. DAVIS.